United States Patent [19]
Davis

[11] 3,903,699
[45] Sept. 9, 1975

[54] SOLAR ENERGY POWER SYSTEM

[75] Inventor: Billy K. Davis, Huntsville, Ala.

[73] Assignee: The United States of America as represented by the United States National Aeronautics and Space Administration Office of General Counsel-Code GP, Washington, D.C.

[22] Filed: Dec. 4, 1973

[21] Appl. No.: 421,702

[52] U.S. Cl. ............... 60/641; 165/105; 126/271; 244/173; 60/659
[51] Int. Cl. ............................................. F03g 7/02
[58] Field of Search ....... 60/641; 165/105; 126/271; 244/173

[56] References Cited
UNITED STATES PATENTS

| | | | |
|---|---|---|---|
| 1,004,888 | 10/1911 | McIntyre | 126/271 |
| 1,742,861 | 1/1930 | Johnson | 126/271 |
| 2,460,482 | 2/1949 | Abbot | 126/271 |
| 2,933,885 | 4/1960 | Benedek | 60/641 |
| 3,347,309 | 10/1967 | Webb | 165/105 |
| 3,450,195 | 6/1969 | Schnacke | 165/105 |

*Primary Examiner*—Martin P. Schwadron
*Assistant Examiner*—Allen M. Ostrager
*Attorney, Agent, or Firm*—George J. Porter; L. D. Wofford, Jr.; John R. Manning

[57] ABSTRACT

A solar energy vapor (freon) powered system for generating electrical energy in which a portion of the heat absorbed from the sun in daylight is stored for use during darkenss by a thermal capacitor in which a mass of Pyrone, having a high thermal capacity, liquifies when heat is applied to it and goes through a solidification process to provide a heat output. A highly efficient solar boiler is constructed utilizing an anodized titanium surface and a particular combination of shaped boiler tubes and complementary reflectors. The overall efficiency of the system is further improved by a unique arrangement of heat recovery devices.

11 Claims, 9 Drawing Figures

3,903,699

SOLAR ENERGY POWER SYSTEM

ORIGIN OF THE INVENTION

The invention described herein was made by an employee of the United States Government and may be manufactured and used by or for the Government of the United States of America for Governmental purposes without the payment of any royalties thereon or therefor.

BACKGROUND OF THE INVENTION

1. Field of the Invention

This invention relates to solar power systems and particularly to a system of this catagory adapted for employment in outer space.

2. General Description of the Prior Art

The idea of generating electrical power from heat from solar energy is of course not new. The problem is that of achieving an efficiency to make such a system feasible. The problem has two particular aspects. One is that of efficiently translating solar energy into a heated working medium; and another is achieving sufficient efficiency in the utilization of the working medium. It is believed clear that before a wide spread use of solar energy can be expected that significant improvements must be made in both these areas.

It is, accordingly, one object of this invention to provide a solar boiler capable of greater effectiveness in converting solar radiation into a heated work medium and another to provide an overall system for the generation of power from it with improved efficiency.

SUMMARY OF THE INVENTION

In accordance with the invention, a solar energy type power generating system is constructed wherein a low boiling temperature fluid, such as freon (T.M.) 114, is vaporized in a solar boiler and employed to operate a turbine. To maintain operation of the turbine in the absence of sunlight, the system includes a thermal storage device which contains a meltable substance such as pyrone (trade name), $C_7H_8O_2$, which is melted to a hot liquid by a portion of the solar boiler heat during daylight and thus accumulates heat. Then during periods of no sunlight, vapor is generated by the thus stored heat to operate the turbine. As one further feature of the invention, the solar boiler employs an anodized outer surface, particularly a blue anodized surface. This, it has been found, enhances the effectiveness of translation of the sun's rays into useful heat. Further, this surface, when polished, provides an improved ratio of heat absorption to heat emission and thus an improved overall efficiency for the system. The system further includes means for recovery of what would otherwise be lost heat and still further includes a combination solar boiler and radiant condenser assembly which particularly facilitates employment of the system with spacecrafts.

DETAILED DESCRIPTION OF THE DRAWINGS

Figure 1:
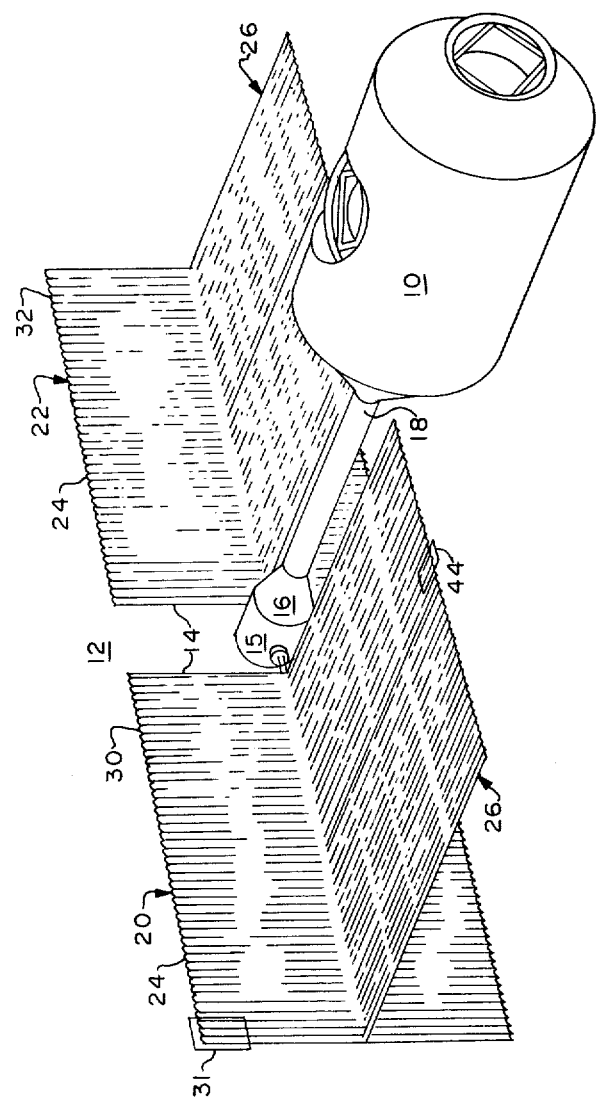
FIG. 1 is a pictoral view of an embodiment of the invention as it would be used in conjunction with a spacecraft.
Figure 2:
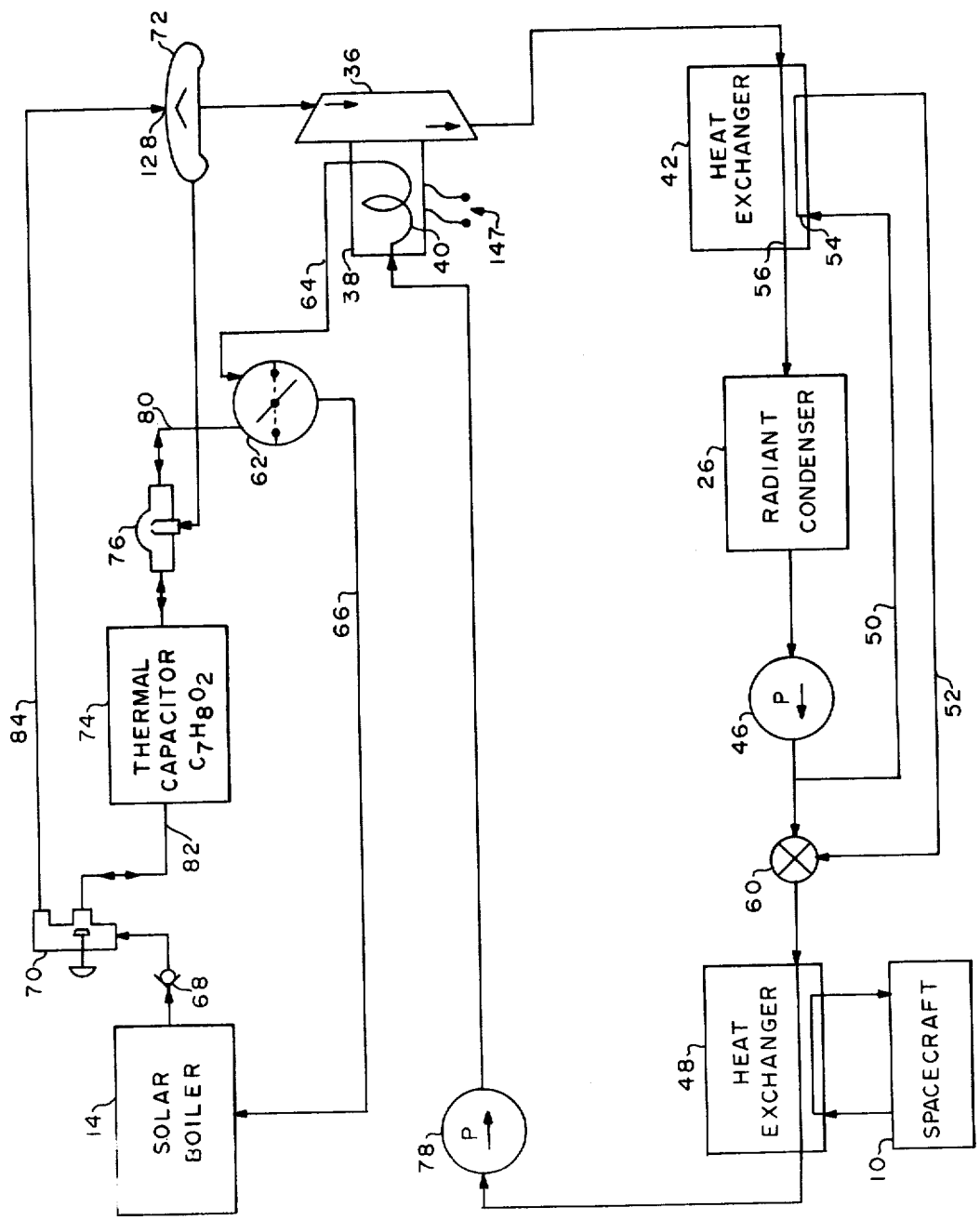
FIG. 2 is a schematic illustration of the system of this invention.

FIG. 1 shows a spacecraft 10 equipped with a power system 12 supplied vapor pressure by boiler 14 (FIG. 2). Electrical generating equipment and certain other portions of the system are contained in cylindrical housing 15 having a conical end 16 connected by boom 18 to spacecraft 10, boom 18 supporting the power system and providing internal passageway for fluid lines and electrical cables connecting to the spacecraft. FIG. 1 particularly illustrates two T-shaped, collapsible solar boiler-radiant condenser arrays 20 and 22 which heat a working fluid for a turbine-operated generator and condense the fluid output from the turbine, respectively. Each array employs a solar boiler or heat collecting panels 24 and radiant condenser or radiating panels 26. Heat collecting panels 24 generally conform to vertical planes (as shown) with forward sides of the panels (opposite to facing side shown in FIG. 1) being adapted to be illuminated by and to intercept maximum radiation from the sun.

Conversely, heat radiating panels 26 extend substantially planar from a central region of the collector panels at an angle normal to and rearward of the collector panels and thus they are always shaded by the collector panels from the sun.

Further, in use, each radiating panel 26 is always pointed edge-on to the earth for minimum albedo effect and maximum view of deep space while still remaining in the shadow of the collector panels 24, individually designated 30 and 32.

Referring now to FIG. 2, there is shown a block diagram of a closed loop power system 10 constructed in accordance with this invention. It employs a low temperature boiling fluid, such as freon 114, to operate a turbine 36 which in turn drives an alternator 38. As one means of returning heat to the system, and the system employs several such means, heat exchanger coil 40 is heat coupled to alternator 38. The fluid output of turbine 36, a superheated working fluid, is fed through regenerative heat exchanger 42 to radiant condenser 26.

Pump 46 is connected to the output of radiant condenser 26 and it pumps condenser or liquid freon to spacecraft heat exchanger 48 along two paths. One path is back through pipes 50 and 52 to heat exchanger coil 54 which functions to pick up heat from coil 56 and preheat the liquid freon before it is fed to boiler 14. The other path is directly to spacecraft heat exchanger 48. Flow is through a flow dividing valve 60 which is adjustable to vary the ratio of flow of fluid between the paths. In this fashion, a desired degree of heat may be transferred around radiating condenser 26. Spacecraft heat exchanger 48 includes liquid lines coupled to spacecraft 10 to absorb heat given off by equipment in the spacecraft. Thus, spacecraft heat exchanger 48 provides a second stage of liquid preheating. The liquid output of spacecraft heat exchanger 48 is pumped by pump 78 through heat exchanger coil 40, coupled to alternator 38 and thence to valve 62. Coil 40 absorbs heat losses from alternator 38, and in so doing, functions as a third stage of liquid preheating. At this point, equipment coupling is in either one of two modes. In one, a daylight operating mode wherein the sun is actively heating solar boiler 14, valve 62 will be as shown and fluid in line 64 will pass downward through valve 62, through line 66 to boiler 14. The fluid is then heated in boiler 14 and the resulting working fluid flows through check valve 68, flow divider 70, gas separator 72, to the inlet of turbine 36 to power it.

Flow divider 70 enables a portion of the freon vapor to be applied to thermal capacitor 74 which functions, as described below, to absorb and store heat. This transfer of heat causes the vapor to be condensed and the resulting liquid freon passes through siphon 76 and down through valve 62 and is forced back to solar boiler 14. Siphon 76, which is also connected to gas separator 72, functions to siphon liquid collected in gas separator 72 and forces it back through valve 62 to boiler 14. Pump 78 provides a pressure which enables the return flow to boiler 14.

During periods when solar boiler 14 is in the dark and thus receiving no heat from the sun, valve 62 is operated to the dashed line position, in which case the fluid flow is from line 80 and in the reverse direction through siphon 76 to thermal capacitor 74 where it picks up heat and is boiled by the previously stored heat in thermal capacitor 74. Check valve 68 prevents flow from line 82 back through solar boiler 14 and thus working fluid flows up through line 84, then down through gas separator 72 to turbine 36. Siphon 76, again due to flow through it, draws residual liquid accumulated in gas separator 72 and cause it to be reheated in thermal capacitor 74.

Figure 3A:
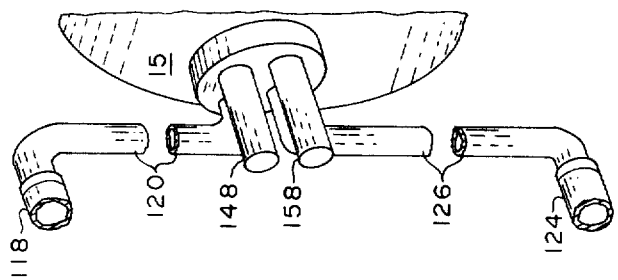
FIGS. 3 and 3a are perspective views of a portion of the solar boiler of the invention as shown in FIG. 1.
Figure 3:
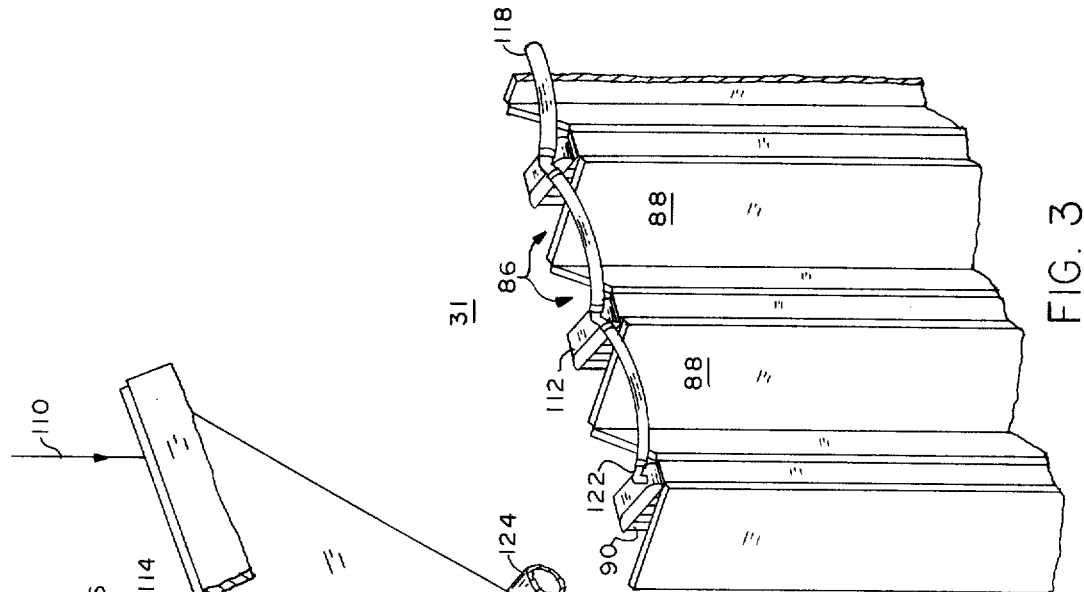
Figure 4:
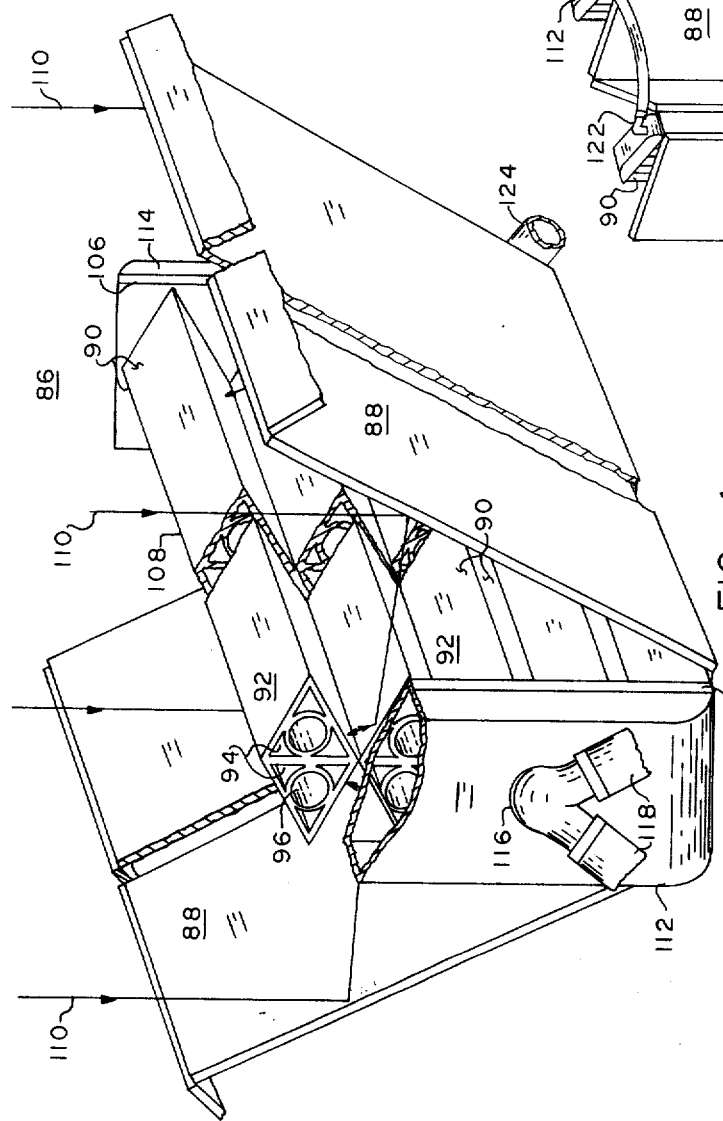
FIG. 4 is an enlarged perspective view of a portion of a solar boiler as contemplated by this invention.

A particular feature of the system is solar boiler 14 consisting of two similar panels 30 and 32 which are, as previously mentioned, disposed on opposite sides of cylindrical housing 15 (FIG. 1). Since these panels are similar, only one panel, panel 30, will be described in detail. FIG. 3 shows an enlarged version of a portion 31 of panel 30 as viewed from the rear side, or the side away from the sun (FIG. 1). Each of panels 30 and 32 includes a plurality of spaced collector assemblies 86 into which solar energy is directed by pivotally interconnected reflecting panels 88. Panels 88 are so configured as to direct the sun's rays onto each opposing surface 90 of laterally disposed tubes 92 of each of solar collector or boiler assemblies 86 (FIG. 4). Each of boiler assemblies 86 includes a predetermined number of tubular elements or tubes 92 commensurate with a desired output power.

Figure 5:
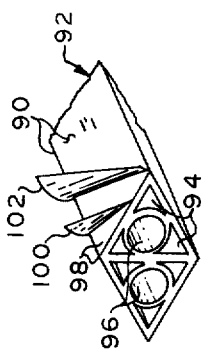
FIG. 5 is a perspective view of a portion of one of the boiler tube assemblies shown in FIG. 4.

Tubes 92 are typically formed from a length of heat conductive material such as aluminum, etc., and are diamond-shaped in cross section (FIG. 5). Each tube 92 includes six longitudinal, essentially triangular, recesses or passages 94 and two cylindrical passages 96 through which the working fluid is circulated. The outer faces 98 are then coated with a thin layer of copper 100 or other suitable material which is adapted to receive as a bonded surface an outer skin member 102 such as titanium alloy Ti 6Al 4VA.

Exposed surface 90 of the titanium is then anodized so as to produce a desired shade of blue. This shade occurs when the absorptivity ($\alpha$) ranges from 0.70 to 0.74. The surface is polished until the emissivity ($\epsilon$) is between 0.15 and 0.16.

When the tubes 92 are supported as described below, the effective surface characteristics are improved such that effectively $\alpha =$ a maximum of 0.97 and $\epsilon =$ a maximum of 0.24. Accordingly, a very efficient and dependable solar boiler can be constructed at much less expense than by utilizing other known techniques of surface treatment and mounting of collector elements. Referring to FIG. 4, tubes 92 are supported by end plates 104 and 106 and the apices 108 of obtuse angles of each of diamond-shaped tubes 92 are joined in mating alignment as shown in FIG. 4. When thus mounted, exposed surfaces 90 are displaced at an angle of 60° with respect to each other such that any ray 110 of the sun, reflected from any reflector 88, impinges on one surface 90 from reflector 88 and then to the adjoining surface 90 wherefrom it is directed along the same path back to the original surface 90 and to the reflector 88. Thus, there is achieved a three-point contact with surfaces 90 of tubes 92. Once the tubes are assembled to end plates 104 and 106, end covers 112 and 114 are sealably joined to support plates 104 and 106, respectively, through which working fluid is circulated by way of Y-shaped fittings 116, only one being shown, FIG. 4. When combined as shown in FIG. 3, collector assemblies 86 are interconnected by lengths of flexible hose 118 which enable each of arrays 30 and 32 to be folded in accordian fashion during a launch phase of a spacecraft.

During sunlight periods, as previously described, working fluid is pumped by pump 78 (FIG. 2) through heat exchanger 40 of alternator assembly 38, thence through diverter valve 62 into solar boiler 14. Working fluid is supplied to each of arrays 30 and 32 (FIG. 3a) by external feeder pipes 120 (only one being shown), which interconnect to the input end of flexible hoses 118. Hoses 118 are adapted to act as an input manifold, being of decreasing diameter toward the outer end 122 in order to distribute the working fluid through collector assemblies 86 at an essentially equal rate of flow. Fluid is forced under pressure through solar collectors 86 and thus extracts heat from each of boiler tubes 92 whereupon it is passed through interconnecting hoses 124 (FIG. 4) at the opposite end of assemblies 86, which are connected to return feeder pipe 126 (FIG. 3a). Thence, flow is to input line 82 of low divider valve 70 (FIG. 2). Heat energy from solar boiler 14 in the form of heated vapor is thus selectively divided by flow divider valve 70, and the portion not needed to drive turbine 36 is stored in thermal capacitor 74 for use during the next period of darkness.

Figure 6:
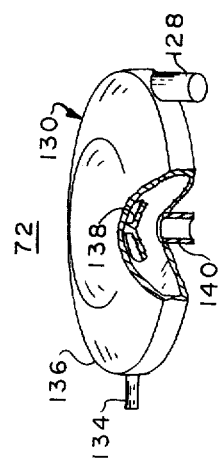
FIG. 6 is a perspective view of a gas separator employed in the system shown in FIG. 2.

Output line 84 couples flow from flow divider valve 70 to input 128 of centrifugal gas separator 72 (FIG. 2). Gas separator 72 (FIG. 6) includes an essentially doughnut-shaped enclosure 130 into which gases are tangentially injected under pressure from flow divider valve 70. This high velocity gas spins the gaseous liquid contents of gas separator 72 causing liquid and heavier particles to be forced outward from central opening 132. The liquid content is then extracted at output 134, formed in outer wall 136 and coupled to the input of siphon 76. Dry saturated gas is discharged around baffle 138 through central opening 140 of gas separator 72 and is then fed to the input of gas turbine 36.

Figure 7:
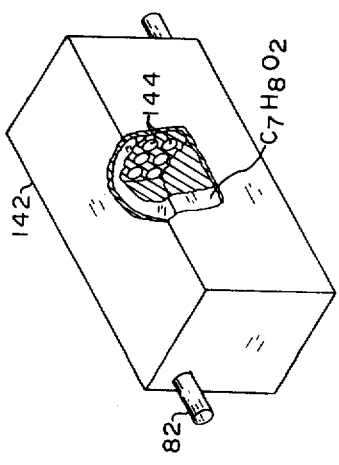
FIG. 7 is a diagrammatic illustration of a thermal capacitor employed in the system shown in FIG. 2.

As mentioned above, that portion of vaporized gases not needed for immediate use to drive turbine 36 is fed by way of flow divider valve 70 through line 82 into the input of thermal capacitor 74 (FIG. 2). Thermal capacitor 74 (FIG. 7) includes rectilinear container 142 which is partially filled with a solid wax-like material, such as that known by the trade name Pyrone, having the chemical designation $C_7H_8O_2$. This material absorbs approximately 100 BTU's per pound as it melts at 270°F. and releases the same amount upon solidification. Vaporized gases from solar boiler 14 are fed through thermal capacitor 74 by means of a fin-tube assembly 144 which is immersed in the wax-like material. Once heat is extracted from the vaporized gas within thermal capacitor 74, it flows through siphon 76 and thence back to the input of solar collector 14. Residual liquid from gas separator 72 is picked up by siphon 76 and is fed in parallel through valve 62 with liquid from boiler feed pump 78 (FIG. 2) to the input of solar boiler 14. The liquid is then reheated to a vapor in the cycle described above wherein gases from the output of solar boiler 14 are again fed to the input of flow divider 70. The above cycle of operation continues as long as the spacecraft is in sunlight. Electrical power is available from alternator 38 on power lines 147 to provide electrical power to spacecraft 10.

A cycle of operation while in earth's shadow is as follows. Upon entering this phase of orbit, diverter valve 62 is switched to the position shown by dotted lines 146 (FIG. 2). Boiler feed pump 78 now pumps liquid freon through valve 62 into what was formerly the output of thermal capacitor 74. Check valve 68, located in the output line from solar collector 14, is now closed by back pressure through thermal capacitor 74. As liquid freon is pumped backward through thermal capacitor 74, input line 82 now becomes the output of thermal capacitor 74 and gas flow is still through output line 84 of flow divider valve 70 downward into gas separator 72. As a result, liquid freon is heated by the molten material within thermal capacitor 74 and this material solidifies as it gives up heat. Dry saturated gas from the output of gas separator 72 is coupled into turbine 36. Residual liquid is fed from output 134 of gas separator into the input of siphon 76. Liquid from valve 62 which is flowing through siphon 76 into thermal capacitor 74 picks up residual liquid from gas separator 72 and pumps it back into thermal capacitor 74 where it is again vaporized and thence fed into flow divider 70. Thus, during operation while the spacecraft is within the earth's shadow, working fluid is vaporized by heat stored in thermal capacitor 74 from a previous cycle of operation in daylight hours.

Figure 8:
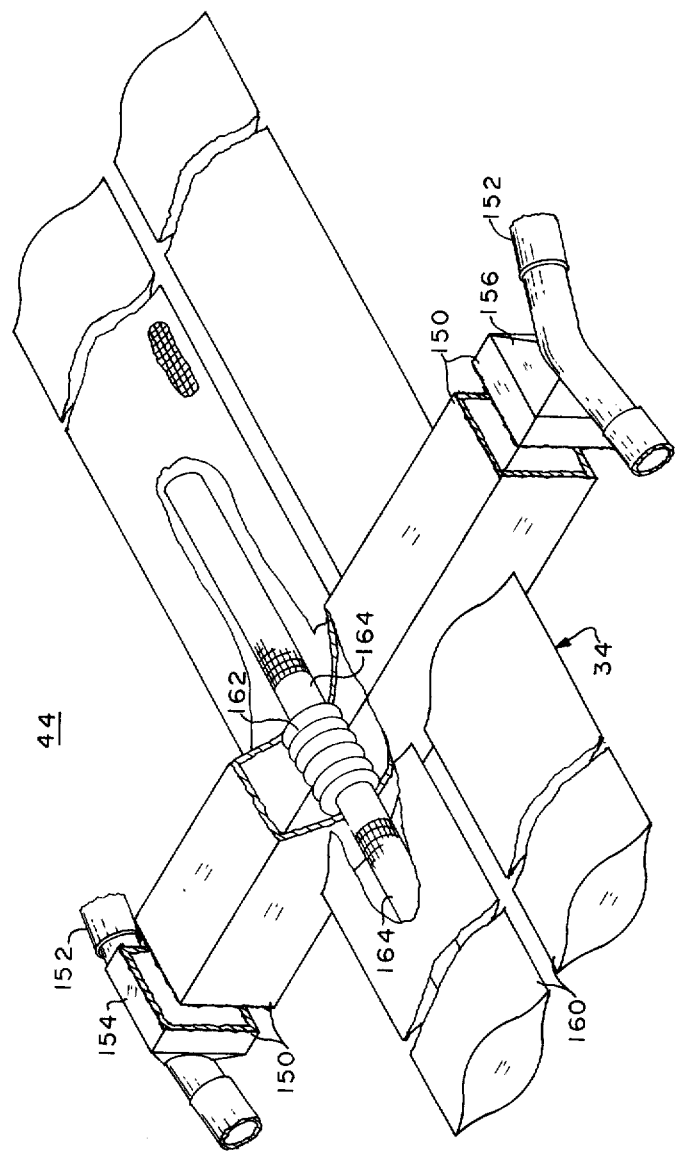
FIG. 8 is a perspective view of a portion of a radiant condenser employed in the system shown in FIG. 2.

Superheated gas from turbine 36 is coupled through one coil 56 of heat exchanger or regenerator 42, as described above, and through feeder line 148 (FIG. 3a) into one of a plurality of laterally disposed feeder tunnels 150 of heat pipe radiator condenser assembly 44 (FIG. 8). These condensing tunnels are interconnected by lengths of flexible hose 152 in a similar fashion to that described above with respect to solar boiler assembly 14. Thus, radiant condenser 26 may be folded in accordian fashion as described above during the launch phase of a spacecraft mission. The outlet or return end 154 of condensing tunnels 150 are interconnected by flexible hoses 152 as are the input ends 156. Cooled liquid is returned through inlet feeder pipe 158 (FIG. 3a) to pump 46 located within central housing 15. Each of feeder tunnels 150 is adapted to mount a number of flexible heat pipes 160 which are supported on opposite sides of tunnels 150. A heat pipe is a known type of heat transfer device and is characterized by a sealed, elongated casing or pipe containing a heat transfer fluid and typically having a heat input at one end and also having a wick adjacent to the inner periphery of the pipe which extends the length of the pipe. This configuration produces a fluid circulation end-to-end of the pipe without the necessity of a pump and thus provides an extremely efficient and effective heat radiator along the outer surface of the pipe. For further discussion of heat pipes and their operation, reference is made to U.S. Pat. No. 3,532,159. In the present case, a finned end 162 of heat coupling element 164 is supported within the interior of each condensing tunnel 150 and it produces a heat transfer to the heat pipe. This heat is then circulated along the heat pipe and thereby radiated into space from the walls of the heat pipe.

Cooled liquid from pump 46 is selectively fed by valve 60 into a second coil 54 of heat exchanger 42 (FIG. 2). Thus heat from turbine 36 is recovered by regenerative heat exchanger 42 and fed to a second input of valve 60, the output of which is then connected to spacecraft heat exchanger 48, wherefrom it is again recycled through boiler 14 (FIG. 2), as previously described.

From the foregoing, it will be apparent that the applicant has provided an improved system for extracting heat energy from the sun. While this invention is particularly directed to applications for providing electrical power for spacecrafts, the principles and means disclosed herein are applicable, in many cases, to earth installation.

What is claimed is:

1. A solar energy power system comprising:
   a boiler comprising:
      a fluid inlet,
      a fluid chamber comprising a plurality of boiler tubes having an outer surface adapted to receive radiant energy and said surface being titanium anodized to a blue surface characterized by an absorptivity of from 0.70 to 0.74 and said surface being polished to a degree yielding emissivity of between 0.15 and 0.16,
      fluid within said chamber, and
      a fluid outlet;
   heat storage means comprising:
      a container,
      a heat exchange line having fluid couplings thereto and said line extending through and providing a heat exchange surface within said container, and
      a mass of material within said container and in engagement with said heat exchange line and adapted to be heated and melted when the temperature of said line exceeds the temperature of said material and to give off heat to said line and solidify when the temperature of said material exceeds the temperature of said line;
   a vapor-pressure powered engine having a vapor inlet and outlet;
   first coupling means for selectively coupling either:
      said heat exchange line of said heat storage means between said outlet and said inlet of said boiler, or
      said heat exchange line of said heat storage means between the outlet and inlet of said boiler and the outlet of said boiler to said vapor inlet of said engine;

condensing means having a vapor inlet and fluid outlet adapted to condense the vapor output of said engine; and second coupling means for selectively coupling either the fluid output of said condenser to the inlet of said boiler or coupling the output of said condenser through said heat exchange line of said heat storage means to the vapor inlet of said engine.

2. A solar energy power system as set forth in claim 1 wherein said condenser comprises a radiant condenser.

3. A solar energy power system as set forth in claim 2 wherein said radiant condenser comprises a plurality of flexible heat pipes.

4. A solar energy power system as in claim 1 wherein:
said boiler comprises a plurality of tubes which are diamond-shaped in cross section, are positioned symmetrically side-by-side, and are oriented and positioned whereby a common plane would intersect opposite edge corners of each boiler tube; and
a reflector assembly of repeated V-shaped configuration symmetrically positioned with respect to said boiler tubes whereby each of a plurality of boiler tubes are positioned within a V and oriented whereby solar radiant energy striking said reflector is directed onto the surface of one tube, and then over to the surface of an adjacent tube.

5. A solar energy power system as set forth in claim 4 wherein an assembly of said boiler tubes and reflectors are arranged essentially in a plane and an assembly of said radiant condensers are arranged essentially in a plane, the latter mentioned plane being perpendicular to the first mentioned plane and said radiating condensers extending centrally from a back side of said reflectors, whereby the two assemblies essentially form a T-shape.

6. A solar energy power system as set forth in claim 5 further comprising an electrical generator driven by said engine and a spacecraft adapted to be powered by said generator and further comprising:
a housing adapted to house said vapor powered engine and generator and including means for supporting said T-shaped said assemblies; and
an elongated coupling member supported by said spacecraft and in turn supporting said housing.

7. A solar energy power system as set forth in claim 6 further comprising heat exchanging means in circuit with said spacecraft and a fluid output of said vapor powered engine for coupling a desired quantity of heat between said spacecraft and said fluid.

8. A solar energy power system as set forth in claim 1 further comprising a heat exchanger heat coupled to said power generator and said fluid output from said vapor powered engine for applying heat to said fluid.

9. A solar energy power system as set forth in claim 7 further comprising:
second heat exchanging means for exchanging heat between a first fluid pipe to a second fluid pipe, said first fluid pipe coupling fluid flow between the fluid outlet of said engine and fluid inlet of said radiant condenser; and
valve means for receiving the fluid output from said radiant condenser and selectively recirculating a portion of it through said second fluid pipe of said second heat exchanging means;
whereby the fluid, a liquid output from said radiant condenser, is heated from heat extracted from the vapor output of said engine, thus the efficiency of the system is enhanced.

10. A solar energy power system as set forth in claim 9 wherein:
said second heat exchanging means, said radiant condenser, said heat exchanging means, and said heat exchanger coupled to said electrical power generator are coupled, in this order, in circuit from the fluid outlet of said vapor-powered engine to said second coupling means; and
said system further comprises a first pump connected between said radiant condenser and said valve means and a second pump in circuit with said heat exchanging means and said heat exchanger coupled to said electrical power generator and between said valve means and said second coupling means.

11. A solar energy power system comprising:
a vapor-powered engine having a vapor inlet and outlet;
a generally planar radiant condenser having an inlet and outlet and comprising a plurality of flexible heat pipes arranged side-by-side and said inlet being connected to the vapor outlet of said engine;
a generally planar solar boiler having an inlet and outlet and further comprising:
a plurality of fluid coupled boiler tubes, each tube being diamond shaped in cross-section, and said tubes being positioned symmetrically side-by-side and being oriented and positioned whereby a common plane would intersect a pair of opposite edge corners of said boiler tubes, and
a generally planar reflector assembly of repeated V-shaped reflectors symmetrically positioned with respect to said boiler tubes whereby each of said tubes is positioned within a V and oriented whereby solar radiant energy striking a said reflector is directed onto the surface of one tube and then over to the surface of an adjacent tube;
mounting means for positioning said planar solar boiler and said planar radiant condenser perpendicular with the planar said radiant condenser extending centrally from a back side of said reflectors whereby the combination of said solar boiler and said radiant condenser is essentially of a T shape; and
means for coupling the outlet of said radiant condenser to an inlet of said solar boiler.

* * * * *